(12) United States Patent
Gulick, Jr. et al.

(10) Patent No.: US 6,373,637 B1
(45) Date of Patent: Apr. 16, 2002

(54) DIAGONAL LENTICULAR IMAGE SYSTEM

(75) Inventors: Stephen Gulick, Jr., Rochester; Roy Y. Taylor, Scottsville, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/660,657

(22) Filed: Sep. 13, 2000

(51) Int. Cl.$^7$ .................. G02B 27/10; G03B 21/00; G03B 25/02
(52) U.S. Cl. .................. 359/619; 353/32; 40/454
(58) Field of Search ................ 359/619, 626, 359/455, 463; 353/7, 32; 40/411, 421, 454

(56) References Cited

U.S. PATENT DOCUMENTS

| | | | |
|---|---|---|---|
| 3,409,351 A | * 11/1968 | Winnek | 353/7 |
| 5,076,661 A | * 12/1991 | Bradley | 359/456 |
| 5,629,797 A | * 5/1997 | Ridgeway | 359/646 |
| 5,647,151 A | * 7/1997 | Fantone et al. | 40/454 |
| 5,812,152 A | * 9/1998 | Torigo et al. | 347/2 |
| 5,828,495 A | * 10/1998 | Schindler | 359/621 |

* cited by examiner

Primary Examiner—Loha Ben
Assistant Examiner—Saeed Seyrafi
(74) Attorney, Agent, or Firm—William F. Noval

(57) ABSTRACT

A method of making a lenticular image product comprising:

providing a plurality of frames oriented for viewing in a pre-selected direction; rotating each of said frames to a pre-selected angle relative to said pre-selected direction;

digitizing each of said frames to create image elements parallel to said pre-selected direction generating a digital lenticular image by multiplexing said image elements of each of said frames;

producing a viewable lenticular image from said digital lenticular image by scanning said multiplexed image elements on a recording element;

associating said viewable lenticular image or a representation thereof with a lenticular lens element having an array of lenticules with parallel lenticule axis, said image elements being parallel with said lenticular axis; and creating a viewable lenticular image product by rotating said lenticular lens element so that said lenticule axis are at said preselected angle and said lenticular image is oriented in said preselected direction.

13 Claims, 4 Drawing Sheets

DIAGONAL LENTICULAR IMAGE SYSTEM

FIELD OF THE INVENTION

This invention relates in general to lenticular imaging and relates more particularly to a diagonal lenticular image system.

BACKGROUND OF THE INVENTION

Lenticular images include an array of cylindrical lenses (or lenticules) in a lenticular material and a sequence of spatially multiplexed images that are viewed through the lenticular material so that different frames of the multiplexed images are viewed at different angles by the viewer. One image effect produced by the lenticular image is a depth or stereoscopic image where the lenticules are oriented vertically and one eye views one frame of a stereo pair or sequence and the other eye views another frame from the stereo pair. Another image effect is a motion image where different frames in a motion sequence are viewed by both eyes, while changing the angle at which the image is viewed. In this image effect, the lenticules can be oriented in the horizontal direction and the lenticular material is about a horizontal axis. Other image effects that combine stereoscopic and temporal sequences, or form collages of unrelated images that can be viewed from different viewing angles have been provided, however, a lack of correlation of image content depends on a common psychological characteristic in humans, typically called dominant eye, to avoid viewing stress. One explanation for the dominant eye characteristic is that the brain merely ignores conflicting data received from the subdominant eye and concentrates only on the data from the dominant eye The characteristic of dominant eye allows man to view a scene while one eye is blocked by a tree, or to accurately aim through a monocular telescopic sight. These other effects include zoom images (one or more images are zoomed from wide angle to narrow angle views), flip images (images of different scenes which may or may not be related), animation images (images simulate motion of an unanimate object), computer generated images, or combinations of different effects, however an image with a higher degree of image data correlation would be appreciated by more viewers with less reliance on the dominant eye characteristic.

Lenticular images are formed by decomposing each of several images into image elements equaling the number of lenticules in the lenticular lens element. A set of image elements is multiplexed, one image element for each of the several frames, for each lenticule. Thus, if there are ten frames and one hundred lenticules, each of the ten frames are decomposed into one hundred image elements, and a set of ten image elements, one for each frame are associated with each lenticule.

The multiplexed images can be generated as a digital image file and scan-printed either directly onto a lenticular lens element having a recording layer or onto a master print recording layer which is used to contact-print or optical-projection-print onto a print media which is subsequently laminated to a lenticular lens element or which forms a recording layer of the lenticular lens element.

Typically, two to thirty frames can be multiplexed into a single lenticular image.

There exists a need for a lenticular image product which presents a image-correlated stereoscopic representation of a motion sequence of a subject and a method of making such a product. Although diagonally-oriented lenticular lens elements have been known in prior art, none of the following disclose a fulfillment of this viewing need. Thus, U.S. Pat. No. 3,409,351, issued Nov. 5, 1968, inventor Winnek, discloses a method of projecting optical printing data from a master print onto print media wherein the pitch of the master print element sets differ from the lenticular pitch, but does not discuss the issues of combine image effects. Winneck teaches the method of projecting, from a composite stereograph which comprises a picture and is divided into picture components each subdivided into aspect elements, and which is arranged for a predetermined viewing axis, an image that constitutes a second composite stereograph which comprises an image of the picture and is divided into picture components each subdivided into aspect elements, and which is arranged to have a like viewing axis and comprising: associating with said first stereograph and with a surface to receive said image, respective first and second lenticular screens each comprising a multiplicity of parallel, linear, component resolving lenticular ridges; illuminating the first stereograph: and optically projecting from said first stereograph through its associated screen, then through an intermediate slit crosswise of the viewing axis of said first stereograph and onto said surface through the screen associated therewith, an image of said first stereograph, while preventing appreciable extraneous patterns in said image as viewed through the last-mentioned screen, by disposing said screens so that the ridges of one extend at an angle, selected in the range of 10" to 60", to the ridges of the other while maintaining the ridges of each at an angle of not more than 45° to the viewing axis of the first stereograph, to establish said image on said surface with a viewing axis substantially aligned with said axis of the first stereograph.

U.S. Pat. No. 5,076,661, issued Dec. 31, 1991, inventor Bradley, discloses a rear projection screen for color television of the type having an array of vertically oriented, parallel lenticular elements on the front surface, uses two diagonally crossed, parallel lenticular element arrays embedded in the screen to control spreading of light into the front lenticular array, achieving better control and less attenuation of the light than system using surface of bulk diffusion or a single horizontal lenticular array. See also: Japanese Patent number JP9024570, published Jan. 28, 1997, inventors Fumio et al., Japanese Patent number JP9026503, published Jan. 28, 1997, inventors Fumio et al.

SUMMARY OF THE INVENTION

According to the present invention, there is provided a solution to the viewing problems of the prior art.

According to a feature of the present invention, there is provided a method of making a lenticular image product comprising:

providing a plurality of frames oriented for viewing in a pre-selected direction; rotating each of said frames to a pre-selected angle relative to said pre-selected direction;

digitizing each of said frames to create image elements parallel to said pre-selected direction.

Generating a digital lenticular image by multiplexing said image elements of each of said frames;

producing a viewable lenticular image from said digital lenticular image by scanning said multiplexed image elements on a recording element;

associating said viewable lenticular image or a representation thereof with a lenticular lens element having an array of lenticules with parallel lenticule axis, said image elements being parallel with said lenticular axis; and creating a viewable lenticular image product by rotating said lenticular lens element so that said lenticule axis are at said pre-selected angle and said lenticular image is oriented in said pre-selected direction.

According to another feature of the present invention there is provided a lenticular image product comprising:

a lenticular image representing different perspectives and frames of time in a stereographic representation of a motion sequence of a subject, said lenticular image being oriented for viewing in a pre-selected direction;

a lenticular lens element being associated with said lenticular image and having an array of lenticules with parallel lenticule axis, said lenticule axis being at a pre-selected acute angle of 10° to 80° to said pre-selected direction, such that rotation of said lenticular image product about a first axis parallel to said pre-selected direction presents a stereographic depth view and rotation of said lenticular product about a second axis perpendicular to said first axis presents a motion sequence view.

ADVANTAGEOUS EFFECT OF THE INVENTION

The invention has the following advantages.

1. A lenticular image product is provided that presents a lenticular image representing different perspectives frames and different time frames in a image-correlated stereographic representation of a motion sequence of a subject.

2. A simple, efficient method is provided for making the lenticular image product of Par. 1.

DETAILED DESCRIPTION OF THE INVENTION

In general, the present invention includes a lenticular image product having a lenticular image representing different perspective frames and different time frames in a stereographic representation of a motion sequence of a subject which is oriented for viewing in a generally vertical direction. The product has a lenticular lens element which has lenticules with axes at a diagonal of 10° to 80° to the vertical, preferably 45° to the vertical. Rotation of the product about a vertical axis presents a stereographic depth view and rotation of the product about a horizontal axis presents a motion sequence view.

Figure 1:
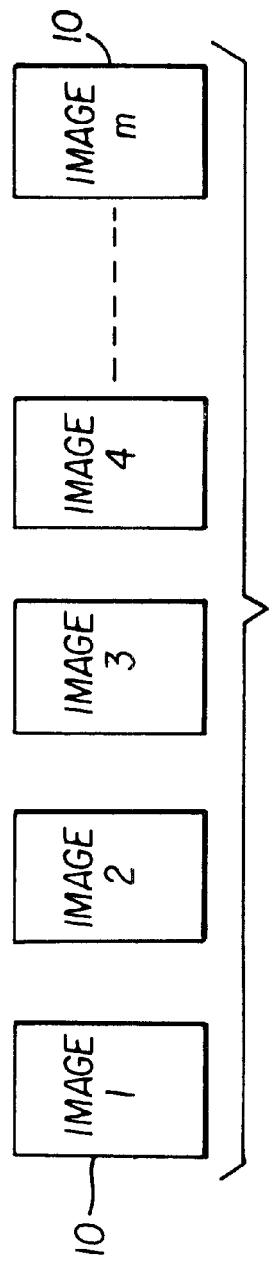
FIG. 1 is a diagrammatic view showing 1–n frames to be used in a lenticular image.
Figure 2:
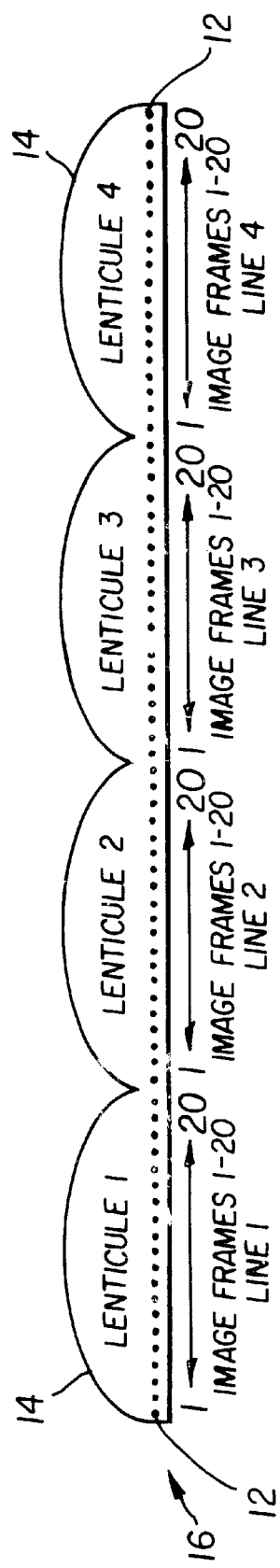
FIG. 2 is a diagrammatic view of a lenticular image product useful in explaining the lenticular effect.
Figure 3:
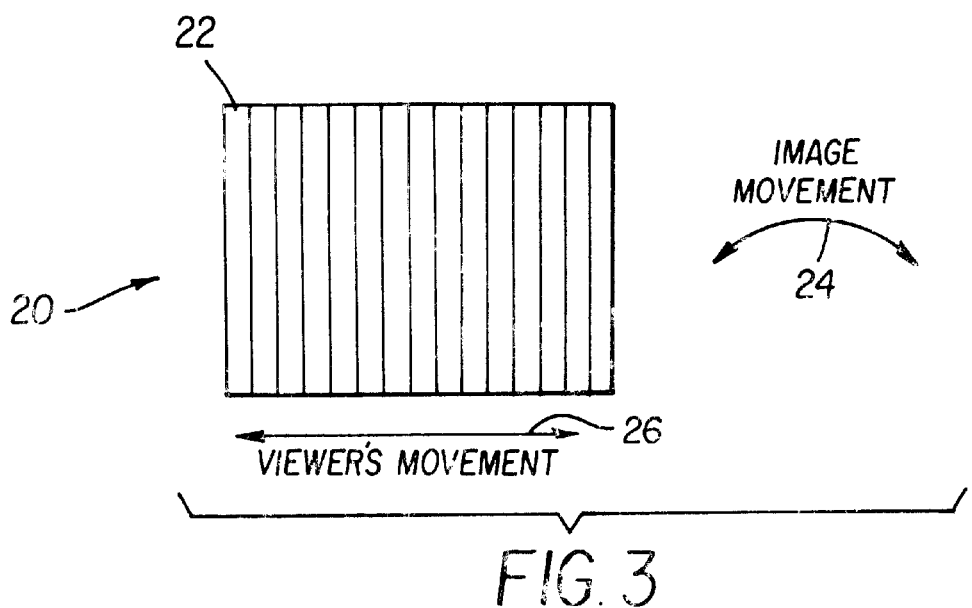
FIGS. 3 and 4 are diagrammatic views of lenticular image products illustrating different viewing modes.
Figure 4:
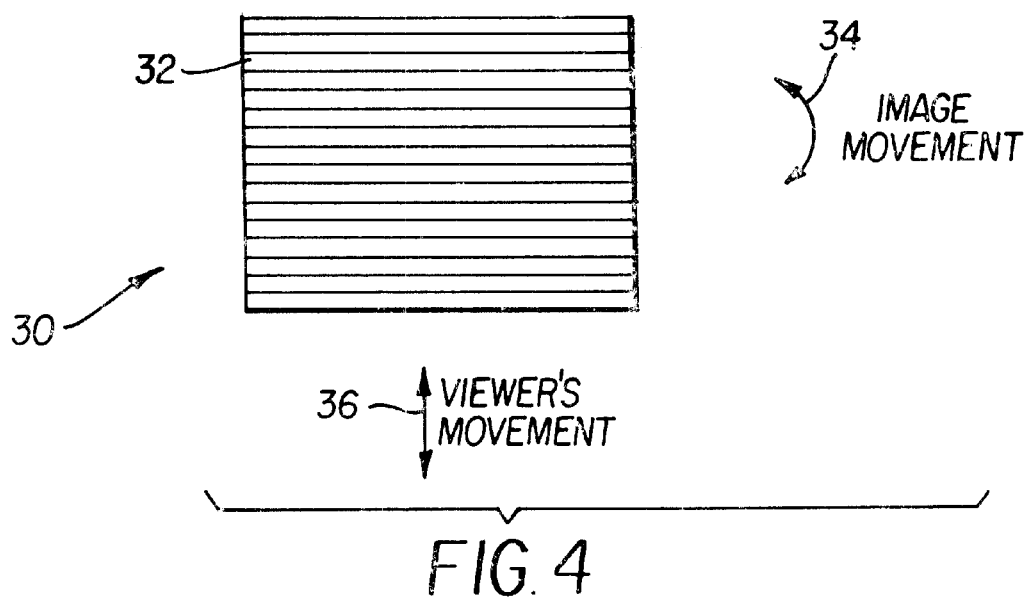

As shown in the FIGS. 1–4, a lenticular image product is formed from a lenticular image associated with a lenticular lens element having an array of lenticules with parallel lenticule axes. The lenticular image is made up of several frames 10 1–n (e.g., 20 images) (FIG. 1) which are decomposed into image elements 12 equaling the number of lenticules 14 in the lenticular lens element 16. FIG. 2 shows image elements 1 from image frames 1–20 associated with lenticule 1, image elements 2, from image frames 1–20 associated with lenticule 2, image elements 3 from image frames 1–20 associated with lenticule 3, and image elements 4 from frames 1–20 associated with lenticule 4. FIG. 3 shows a lenticular image product 20 with the lenticules 22 arrayed in a vertical direction, wherein rotation about a vertical axis (arrow 24) presents a depth or stereoscopic view. Motion is limited. FIG. 4 shows a lenticular image product 30 with the lenticules 32 arrayed in a horizontal direction, wherein rotation about a horizontal axis (arrows 34) presents a motion sequence view with no depth. The same effects can be obtained if the viewer moves laterally (arrow 26) with respect to the FIG. 3 product 20 or moves vertically (arrow 36) with respect to the FIG. 4 product 30.

Laterally viewed images include:

depth images, depth flip images, flip images, layered depth images.

Following is a brief description of these laterally viewed images.

Flip Images (Laterally Viewed)

Flip images are frames of different scenes, which may or may not be related, that appear in succession as the viewer moves left to right relative to the image.

Depth Images

Depth images present the viewer with a 3-D effect and reveal look-around characteristics. As the viewer moves left to right relative to the image, they can actually see behind the primary object(s) in the image.

Depth Flip Images

Depth Flip Images are an offshoot of depth and flip images. Multiple depth images are created and printed as Flip Images.

Layered Depth Images

Layered Depth Images are created by placing 2-D objects at different foreground and background locations relative to a central object location. Since the objects are 2-D, there is no look around feature.

In general the process for creating a lenticular image is as follows;

1. Create the basic frames from photographic and/or computer-generated views.
2. Convert the frames to a digital image file by decomposing each to image elements and multiplexing the image elements so that there is a set for each lenticule.
3. Print the digital file on a high resolution digital printer to create a "master" print.
4. Contact print from the "master" to produce the saleable prints.
5. Laminate the contact print to a lenticular lens element which is a series of parallel lenticular lenses that run from one boundary of the final product to the other.

For a stereoscopic view, the same scene from different viewpoints corresponding to a viewer's left and right provide the image sets when the frames are decomposed into image elements, the stereo images are sliced into spaced apart image elements.

For lenticular images with vertical lenticular, each frame is digitally recomposed into multiple line elements from left to right. This creates successive image slices as sequential lines of data. These lines are sequentially printed under each lenticule. Line 1 from frame 1 is printed under lenticule 1, line 2 from frame 1 is printed under lenticule 2, etc. (see FIG. 2). The number of lines of data or image slices per frame is equal to the number of lenticules in the final product. The collective projection of all the lenticules in a particular viewing direction presents the viewer with the complete frame.

Multiple lines of data can be printed under each lenticule. By digitally recomposing multiple frames and printing them as successive line of data under each lenticule, many different frames can be viewed at different viewing locations, each lenticule projects a different line of data as the viewer location changes relative to the image, successive image lines are projected by each lenticule thus providing different image frames to the viewer. The result is the viewer sees a look-around stereoscopic image sequence as they move their head left to right relative to the lenticular image.

According to the present invention, a diagonal lenticular lens element associated with a lenticular image representing different perspectives and frames of time in a stereographic representation of a motion sequence of a subject presents different types of views when the product is rotated about the vertical axis as opposed to about the horizontal axis.

Figure 5:
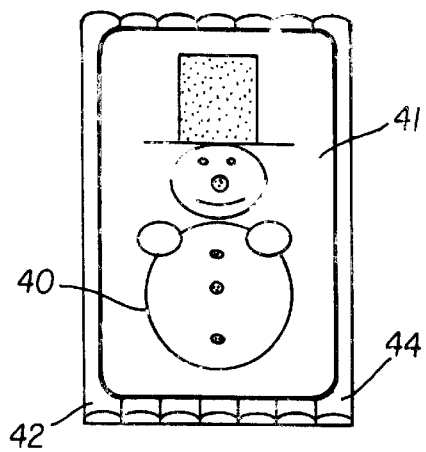
FIGS. 5–10 are diagrammatic views useful in explaining the present invention.
Figure 6:
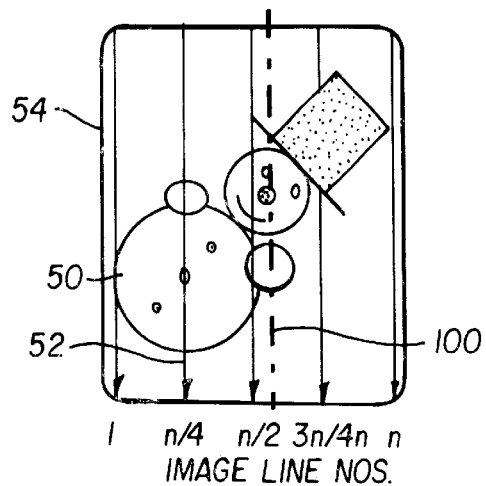
Figure 7:
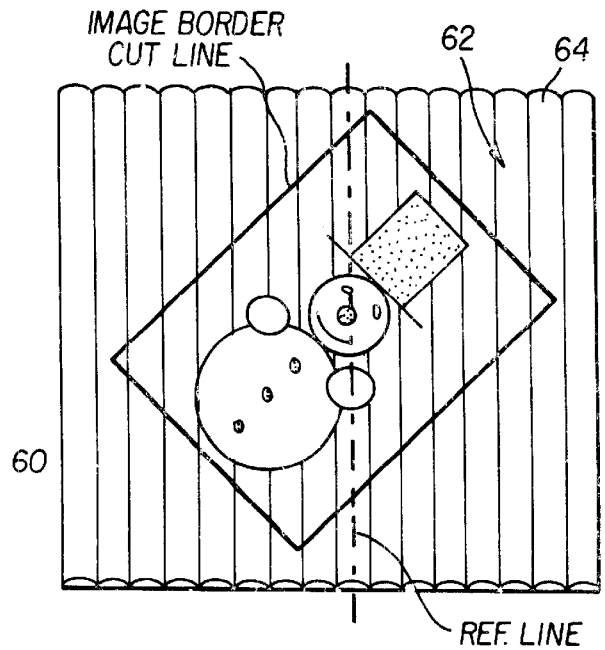
Figure 8:
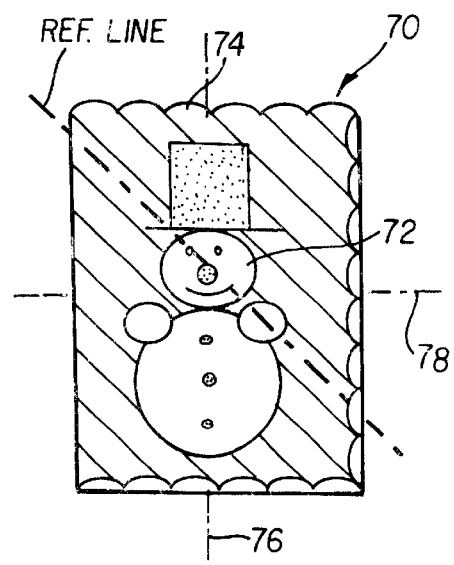

Individual image data lines for vertical lenticular display are generated from the top of the image to the bottom with the image oriented in the vertical direction (see FIG. 5) as shown image 40 on film 41 is oriented vertically and parallel to lenticules 42 of lenticular screen 44. For the Diagonal Lenticular Display, the digital image file is created in a different manner. The image 50 for each frame is rotated to the desired diagonal and then digitized with image lines from 1 to n and printed from top to bottom in direction 52 on film 54 (see FIG. 6). The saleable print 60 is laminated to the lenticular screen 62 with the image lines oriented parallel to the lenticules 64 (see FIG. 7). (This process is the same with vertical lenticular). FIG. 8 shows the image oriented for viewing after a lenticular sheet is cut to size to form lenticular image product 70 with images 72 oriented vertically and lenticules 74 oriented at an angle of 10° to 80°, preferably 45° to the vertical. When product 70 is rotated about a vertical axis 76, depth is presented to a viewer. When product 70 is rotated about a horizontal axis 78, a motion sequence is presented to a viewer. In FIGS. 6, 7 and 8 note the reference line 100 which represents an image data line showing the relationship to the image and to the lenticules.

The images represent different perspectives and frames of time in a stereographic representation of a motion sequence of a subject which is oriented for viewing in a generally vertical direction. A plurality of images oriented for viewing in a vertical direction are provided. The images are rotated to an angle of 10° to 80° to the vertical, preferably 45° to the vertical. The images are digitized to create image elements parallel to the vertical A digital lenticular image is generated by multiplexing the image elements of each image. A viewable lenticular image is produced by scanning the multiplexed image elements on a recording element. The viewable lenticular image is associated with a lenticular lens element having parallel lenticules such that the lenticules are at the rotational angle to the vertical, with the images oriented vertically. Rotation about a vertical axes presents a stereoscopic depth view while rotating about a horizontal axes presents a motion sequence view.

To prevent a vertical shift of the images as the viewer moves left or right, the start point of each view can be changed by progressively cropping the views in the vertical direction.

Figure 9:
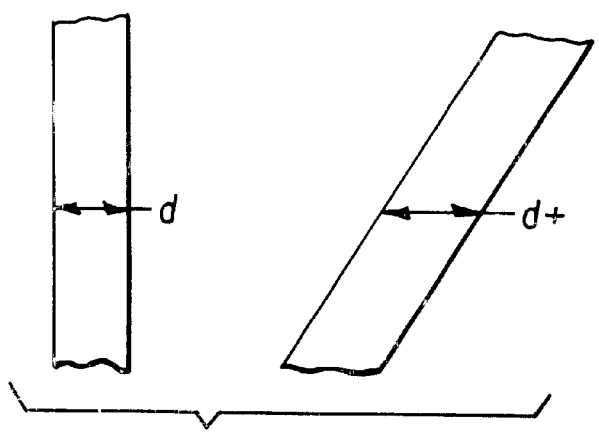

Another advantage of this invention is that the primary angle is widened and thus more views can be placed under each lenticule, allowing for a greater range content that fills in some of the gaps to show smoother changes. The width of this area will vary based on the orientation of the lens sheet to the image content. FIG. 9 shows the standard spacing of the lens and an angled orientation allows for the greater view.

Figure 10:
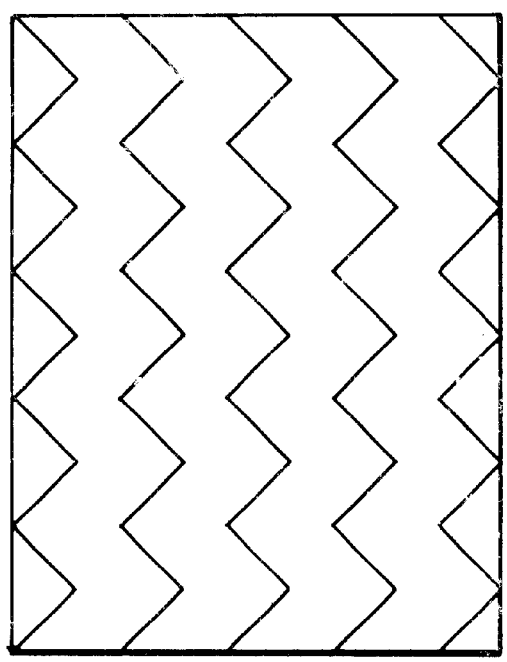

FIG. 10 shows an alternative to the prior construction of the lenticular lens, whereby lenticular lens element is composed of a herringbone or zigzag pattern composed of lens elements that alternate back and forth.

The lenticular image can also be formed in a recording layer of a lenticular lens element by scan printing on a photosensitive layer, by ink jet printing, by thermal printing, either directly or dye transfer, by electrophotographic printing, etc.

The invention has been described in detail with particular reference to certain preferred embodiments thereof, but it will be understood that variations and modifications can be effected within the spirit and scope of the invention.

For example, the orientation of the lenticular material has been described as continuously extending cylindrical sections at an angle of 10° to 80° relative to a vertical. This would be consistent with an extrusion process for generating the lenticular material. However, with a special construction of the lenticular material by injection-molding, the lenticular material could comprise shorter finite sections of both plus and minus angles as in a herringbone fabric pattern. This embodiment may be perceived as esthetically pleasing or present advantages for optical projection image duplication.

PARTS LIST 10 frames
12 image elements
14 lenticules
16 lenticular lens elements
20 lenticular image product
22 vertical lenticules
24 image vertical movement
26 viewer lateral movement
30 lenticular image product
32 horizontal lenticules
34 image horizontal movement
36 image vertical movement
40 lenticular image
42 vertical and horizontal lenticular image
44 lenticular screen
50 lenticular image
52 printing direction
54 film
60 print
62 laminated lenticular screen
64 lenticules
70 product
72 vertical lenticules
74 vertical lenticules
76 vertical axis
78 horizontal axis
100 reference line

What is claimed is:

1. A method of making a lenticular image product comprising:

providing a plurality of frames oriented for viewing in a pre-selected direction;

rotating each of said frames to a pre-selected angle relative to said pre-selected direction;

digitizing each of said frames to create image elements parallel to said pre-selected direction;

generating a digital lenticular image by multiplexing said image elements of each of said frames;

producing a viewable lenticular image from said digital lenticular image by scanning said multiplexed image elements on a recording element;

associating said viewable lenticular image or a representation thereof with a lenticular lens element having an array of lenticules with parallel lenticule axis, said image elements being parallel with said lenticular axis; and creating a viewable lenticular image product by rotating said lenticular lens element so that said lenticule axis are at said pre-selected angle and said lenticular image is oriented in said pre-selected direction.

2. The method of claim 1 wherein said associating step include scan printing said viewable lenticular image on master media and contact printing said master media lenticular image onto a recording layer on said lenticular lens element.

3. The method of claim 1 wherein said associating step includes scan printing said viewable lenticular image directly on a recording layer of said lenticular lens element.

4. The method of claim 3 wherein said scan printing is effected by laser scan printing directly on a photosensitive later of said lenticular lens element.

5. The method of claim 3 wherein said scan printing is effected by one of ink jet printing, thermal printing, electrographic printing directly on a recording layer of said lenticular lens element.

6. The method of claim 1 wherein said associated step includes scan printing said viewable lenticular image on a recording layer which is separate from the said lenticular lens element and subsequently affixed to the lenticular lens element.

7. The method of claim 6 wherein the associated step also includes optical projection to render the pitch of the said viewable lenticular image on a recording layer be properly mated to the pitch of the said lenticular lens element, to which it is subsequently affixed.

8. The lenticular image product of claim 6 wherein said preselected direction and first axis are vertical and said second axis is horizontal.

9. The lenticular image product of claim 6 wherein said lenticular image is formed in a recording layer of said lenticular lens element.

10. The lenticular image product of claim 6 wherein said lenticular image is formed in an imaging element separate from said lenticular lens element and said imaging element and lenticular lens element are affixed together.

11. The lenticular image product of claim 6 wherein said acute angle is +45° degrees or −45° degrees.

12. The lenticular image product of claim 6 wherein said acute angle is +45° degrees or −45° degrees and the lenticular lens element is composed of a herringbone or zigzag pattern composed of lens elements that alternate back and forth.

13. A lenticular image product comprising:

a lenticular image representing different perspectives frames and different time frames in a stereographic representation of a motion sequence of a subject, said lenticular image being oriented for viewing in a preselected direction;

a lenticular lens element being associated with said lenticular image and having an array of lenticules with parallel lenticule axis, said lenticule axis being at a pre-selected acute angle of 10° to 80° to said preselected direction, such that rotation of said lenticular image product about a first axis parallel to said preselected direction presents a stereographic depth view and rotation of said lenticular product about a second axis perpendicular to said first axis presents a motion sequence view.

* * * * *